(12) United States Patent
Keenan et al.

(10) Patent No.: US 9,750,279 B2
(45) Date of Patent: Sep. 5, 2017

(54) PROCESS AND APPARATUS FOR REMOVING A TAIL END OF A BRUSSELS SPROUT

(75) Inventors: Christopher Stephen Keenan, Berwickshire (GB); Dirk Jacobus Bac, Moerkapelle (NL); Bastiaan Rinke Anthony Groeneweg, Rockanje (NL); Ian McLachlan, Ayton Berwickshire (GB); David A. Watson, Bristol (GB)

(73) Assignee: GROWERS EXPRESS, LLC., Salinas, CA (US)

( * ) Notice: Subject to any disclaimer, the term of this patent is extended or adjusted under 35 U.S.C. 154(b) by 1161 days.

(21) Appl. No.: 13/588,306

(22) Filed: Aug. 17, 2012

(65) Prior Publication Data

US 2013/0052311 A1    Feb. 28, 2013

Related U.S. Application Data

(63) Continuation-in-part of application No. PCT/EP2010/001187, filed on Feb. 26, 2010.

(51) Int. Cl.
*A23L 1/212* (2006.01)
*A23N 15/00* (2006.01)
*A23N 15/08* (2006.01)

(52) U.S. Cl.
CPC ........... *A23N 15/003* (2013.01); *A23N 15/08* (2013.01); *Y10T 83/0443* (2015.04)

(58) Field of Classification Search
CPC ...... A23N 15/003; A23N 15/08; A23N 15/04; Y10T 83/0443; Y10T 83/0453; Y10T 83/432

USPC .............................................. 426/231; 99/491
See application file for complete search history.

(56) References Cited

U.S. PATENT DOCUMENTS

| | | | | | |
|---|---|---|---|---|---|
| 2,858,866 | A | * | 11/1958 | Hendry | A23N 15/04 83/409.1 |
| 3,538,969 | A | * | 11/1970 | Cox | A23N 15/01 83/303 |
| 3,653,418 | A | * | 4/1972 | Oldershaw | A23N 15/04 99/639 |
| 3,886,858 | A | * | 6/1975 | Evans | A23N 15/04 426/518 |
| 5,335,571 | A | * | 8/1994 | Pike | B26D 5/00 83/13 |

(Continued)

FOREIGN PATENT DOCUMENTS

NL    WO 2006094837 A1 * 9/2006 ............. A23N 15/08

*Primary Examiner* — Steven Leff
(74) *Attorney, Agent, or Firm* — Oblon, McClelland, Maier & Neustadt, L.L.P.

(57) ABSTRACT

In an aspect, a process for removing a tail end of Brussels sprouts comprises separating a Brussels sprout from a stack and transferring it to a longitudinal transport track. On the track, the Brussels sprout is manipulated to position a longest dimension of the Brussels sprout perpendicular to a direction of travel of the transport track. Near an end of the track, a position and an orientation of each Brussels sprout is defined by photographic detection. Each Brussels sprout is removed from the transport track by a gripper. A position and an orientation of the gripper are defined using the detected position and orientation of the Brussels sprout to be removed. The gripper is re-oriented and moved along a knife to remove the tail end of the Brussels sprout. The Brussels sprout is removed from the gripper and collected.

26 Claims, 7 Drawing Sheets

(56) References Cited

U.S. PATENT DOCUMENTS

| | | | | |
|---|---|---|---|---|
| 6,237,477 B1* | 5/2001 | Huddle | .................. | A23N 15/08 99/546 |
| 7,409,905 B2* | 8/2008 | Huddle | .................. | A23N 15/04 99/546 |
| 2008/0289515 A1* | 11/2008 | Knorr | .................... | A23N 15/02 99/640 |

* cited by examiner

PROCESS AND APPARATUS FOR REMOVING A TAIL END OF A BRUSSELS SPROUT

CROSS REFERENCE TO RELATED APPLICATIONS

This application is a continuation-in-part of PCT/EP2010/001187, filed internationally on Feb. 26, 2010, all subject matter disclosed therein is incorporated by reference in its entirety herein for all purposes.

BACKGROUND

The following relates to a process for removing the tail end of Brussels sprouts. A process for removing the tail end of Brussels sprouts has been described in Dutch patent application 7504554.

In this known process the Brussels sprouts are transported on the upper horizontal part of two parallel endless belts, which horizontal part is mounted above a number of rotating knives which can cut off the tail end of a Brussels sprout if the same is protruding through the gap between the two endless belts. In order to make sure that a Brussels sprout will have its tail end protruding through the gap between the belts; these belts are moving with different velocity thereby generating a rolling movement on the Brussels sprout. Otherwise there is provided an agitating member which will act on the Brussels sprout in order to change its position. In this way most of the Brussels sprouts will have their orientation changed so that at least once during the each Brussels sprout rests on the belts its tail end is protruding through the gap between the belts and cut off.

With this type of process satisfactory results have been obtained although the cutting operation was relatively rough and in general the cut off part was larger than actually needed for the Brussels sprout being acceptable for consumption. Moreover in the last years the shape of the Brussels sprout has been changed in that new species have been developed which have a more round shape compared to the older specie which were more oval.

SUMMARY

Processes and devices for cutting off the tail end of Brussels sprouts are disclosed.

In one example, starting from a stack of Brussels sprouts, one Brussels sprout at a time is separated from the stack and transferred to a longitudinal transport track, on the transport track the Brussels sprout is treated and manipulated such that it occupies a position in which the dimension of the Brussels sprout with the greatest length is positioned substantially perpendicular to the direction of the transport track. Near the end of the transport track, the position and orientation of each individual Brussels sprout is defined by means of photographic detection. Each individual Brussels sprout is removed from the transport track by means of a gripper. The position and orientation of the gripper are defined by means of the detected position and orientation of the Brussels sprout to be removed. The gripper with the Brussels sprout is re-oriented and moved along a knife whereby the tail end of the Brussels sprout is cut off, and the Brussels sprout treated like this is removed from the gripper and collected in a receiving tray.

By handling each Brussels sprout in an individual way and using a cutting system which is adapted to an actual shape of each individual Brussels sprout the cutting process is optimized. More specifically the loss in weight can be reduced to about 10% compared with the 30-40% as was normal with the prior art processes. Moreover, a consumer receives a ready to cook product superior in quality to that produced by the prior art approach. One aspect is that the leaves are still closed around the Brussels sprout during cooking, with the result that the Brussels sprout is still intact after cooking, and fewer loose leafs exist in the cooking vessel.

A further aspect relates to a device for performing the process of removing the tail end of Brussels sprouts. Still further aspects relate to cutting Brussels sprouts in half, either after trimming of the tail end, or alone. Cutting in half is an example of a generalized category of cutting or sectioning sprouts achieved by gripping a sprout and moving the sprout relative to a cutting tool. A variety of implementations of these disclosures can be realized. For example, a water knife can be provided as a cutting tool.

BRIEF DESCRIPTION OF THE DRAWINGS

Other characteristics and advantages of disclosed aspects will become clear from the following description, which references the annexed drawings, in which.

DETAILED DESCRIPTION

The example device for removing the tail end of a Brussels sprout comprises a separation unit, a transport and orientation unit, a detection unit, and a cutting unit. Each Brussels sprout to be handled will pass through these four units before it will be laid down in clean condition in a receiving tray.

It is accepted that Brussels sprouts are supplied as all goods in containers or the like and that, in the separation unit, one Brussels sprout at a time is separated from the stack of products and transferred to the transport and orientation unit.

For that purpose a unit can be used as described in WO-A-2006-094837 which is incorporated by reference into this specification. Although the device described there is intended to be used with onions, the same type of device can be used with minor changes with respect to the dimensions so as to make it usable with Brussels sprouts. The Brussels sprout can first be brought into a storage bin as described in this earlier patent application and transported one by one upwardly. At the end of this upward movement, each individual Brussels sprout will fall into a vertical chute which, having its upper end at the end of the upward movement path of the separation unit and its lower end just above one end of the transport and orientation unit. This lower end is provided with a valve so that a Brussels sprout arriving there can be withheld for some time until a transport set of the transport unit is in the right position as will be described later. At that time the valve can be opened and the Brussels sprout transferred to the transport and orientation unit.

The transport and orientation unit can be of the type as described in Dutch patent specification 1025386. The transport device described in this specification is of the type to be used with onions, but with the same type of device and an adaptation of the dimensions it can also be used for transporting and orienting Brussels sprouts. Part of the transport and orientation unit 10 is shown in the FIG. 1.

Figure 1:
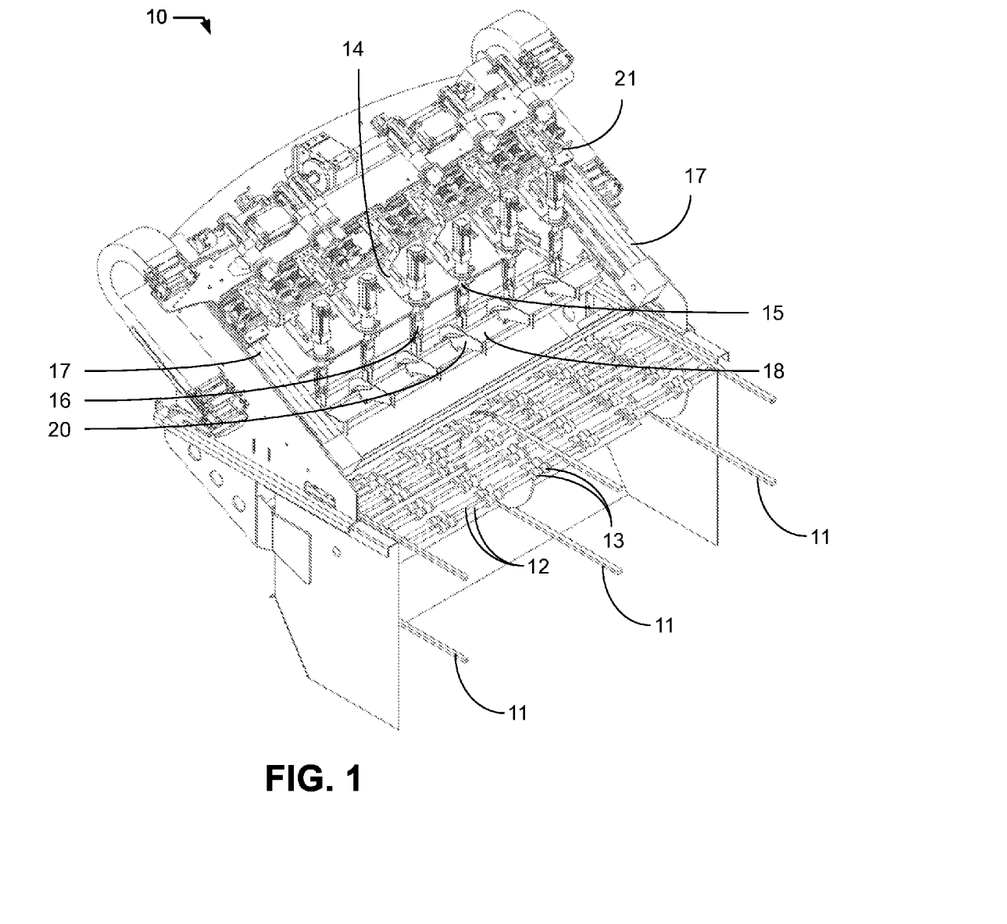
FIG. 1 depicts a perspective view of a portion of a device that can be used in performing processes according to the description.

The transport and orientation unit comprises a number of endless chains 11, each of which is running over a number of wheels, one of which can be driven thereby moving the chains 11. The upper part of each chain is substantially horizontal and forms the so-called transport track; this is the part in which the Brussels sprouts are transported from the separation unit to the cutting unit thereby passing the detection unit.

Between each pair of adjacent chains there is provided a number of pairs of parallel axis 12, each of these axis carry two rollers 13 each having the general form of a truncated cone and the ends with the smaller diameter being directed towards each other. Four rollers on a pair of parallel axis form together a support for a Brussels sprout to be transported as described above. As shown in the drawing between each pair of chains there is a number of pairs of axis and each axis carries more than one pair of rollers, but the invention can be performed with only one pair of rollers on each axis.

Each roller is free rotatable around the axis on which it is mounted. Otherwise each roller is connected to a chain wheel which is free rotatable mounted on the same axis and which in the upper transport track part extends below the chains 11. Under the transport track part of the chains there is mounted a number of endless chains cooperating with these chain wheels, which chains (not shown) can be driven so that during the movement of the chains 11, the rollers are rotatably driven. The movements of these additional chains can be selected in such a way that either the rollers in each set of two pairs are driven in one direction, whereas the other pair of rollers on the adjacent axis are driven either in the same circumferential or in opposite circumferential direction. Moreover, the circumferential velocity can be freely selected.

The additional chains responsible for the rotating movement of the rollers are only active in the part of the transport track before reaching the detection unit. Once a set of rollers entering the detection zone the engagement between the additional chains and the chain wheels stops and the rollers are no longer rotating. In this way, the Brussels sprout is in a stable position for being photographed or otherwise optically analyzed.

As explained in the already mentioned Dutch patent specification 1025386, the movement of the rollers does agitate the Brussels sprout in such a way that it has the tendency to direct its longitudinal axis in a direction which is substantially perpendicular to the direction of the transport track, or the general direction of the chains 11. In this way all the Brussels sprout arriving in the detection unit will have the same orientation in so far that the orientation of the tail end is not fixed but can be twofold.

The detection unit (not shown) is provided in the end part of the transport track above the same and includes a digital camera, where one camera can be provided for each set of four rollers provided on an axis as seen along the longitudinal direction of said axis. As soon as the set of four rollers in a stationary condition and carrying a Brussels sprout arrives at a defined position the camera will make a picture of the Brussels sprout and transfer it to a computer.

In the computer the picture of the Brussels sprout is analyzed in that its circumference is defined and based upon that the largest dimension of the Brussels sprout is defined which will be defined as the longitudinal direction of the Brussels sprout. At the same time the largest dimension of the Brussels sprout in the direction perpendicular to its longitudinal direction is defined and the tail end is defined based upon the general shape of the two ends of the Brussels sprout at the end of the longitudinal axis. The tail end is generally the not rounded end part of the sprout, which has commonly a more or less straight shape. As the Brussels sprout is generally not exactly oriented in a direction perpendicular to the direction of the transport track, the angle position of the Brussels sprout with respect to that direction is also defined. With these data it becomes possible to control a gripping device that will take the Brussels sprout from the set of four rollers and transport it through the cutting unit, before releasing it in a receiving tray.

In the cutting unit there are provided a number of gripping devices, one for each of the parallel transport tracks present in the transport unit, which are adapted to take the Brussels sprouts form the support rollers in the transport tracks.

Each gripping device as such comprises a gripper 16, which is mounted on a substantially vertical axis 15 which is rotatably mounted on a bracket 14. The brackets 14 are mounted on a frame bar 21 which can be moved back and for along a sliding surface 17, which is under an angle with respect to the transport tracks so that by a movement of the frame bar 21 along the sliding surfaces 17, the grippers 16 are moving back and forth with respect to the transport track.

Each of the grippers 16 comprises two claw-like members which are positioned opposite each other as commonly known in the art, and which can be moved towards each other in order to grip a Brussels sprout, and which can be opened so as to release a Brussels sprout. As the axis 15 is rotatably mounted in the bracket the angle orientation of the gripper can be adjusted to the actual angle position of the Brussels sprout of the Brussels sprout on the support rollers in the transport track.

Moreover, the bracket 14 is moveable with respect to the frame bar in a direction parallel to the length of the frame bar 21. This allows the gripper to be adjusted accurately with respect to the Brussels sprout so that the gripper acts on that part of the Brussels sprout with the largest diameter by movement of the gripper to the right position as detected in the detection unit.

The actuation of the different movements to be performed in the gripping unit will not be described in detail as this is obvious for the man skilled in the art. The different movements can be obtained by hydraulic, pneumatic and/or electro-magnetic devices or combinations thereof.

Between the two sliding surfaces 17 there is mounted a bar 18 on which there are mounted a number of knife blades 20 which are oriented with their cutting edge in the direction of the sliding surfaces 17. The position of these knife blades is such that a Brussels sprout gripped by the gripper 16 and oriented in the right way will be removed from its tail end during the movement of the frame bar upwardly along the sliding surfaces 17.

Figure 2:
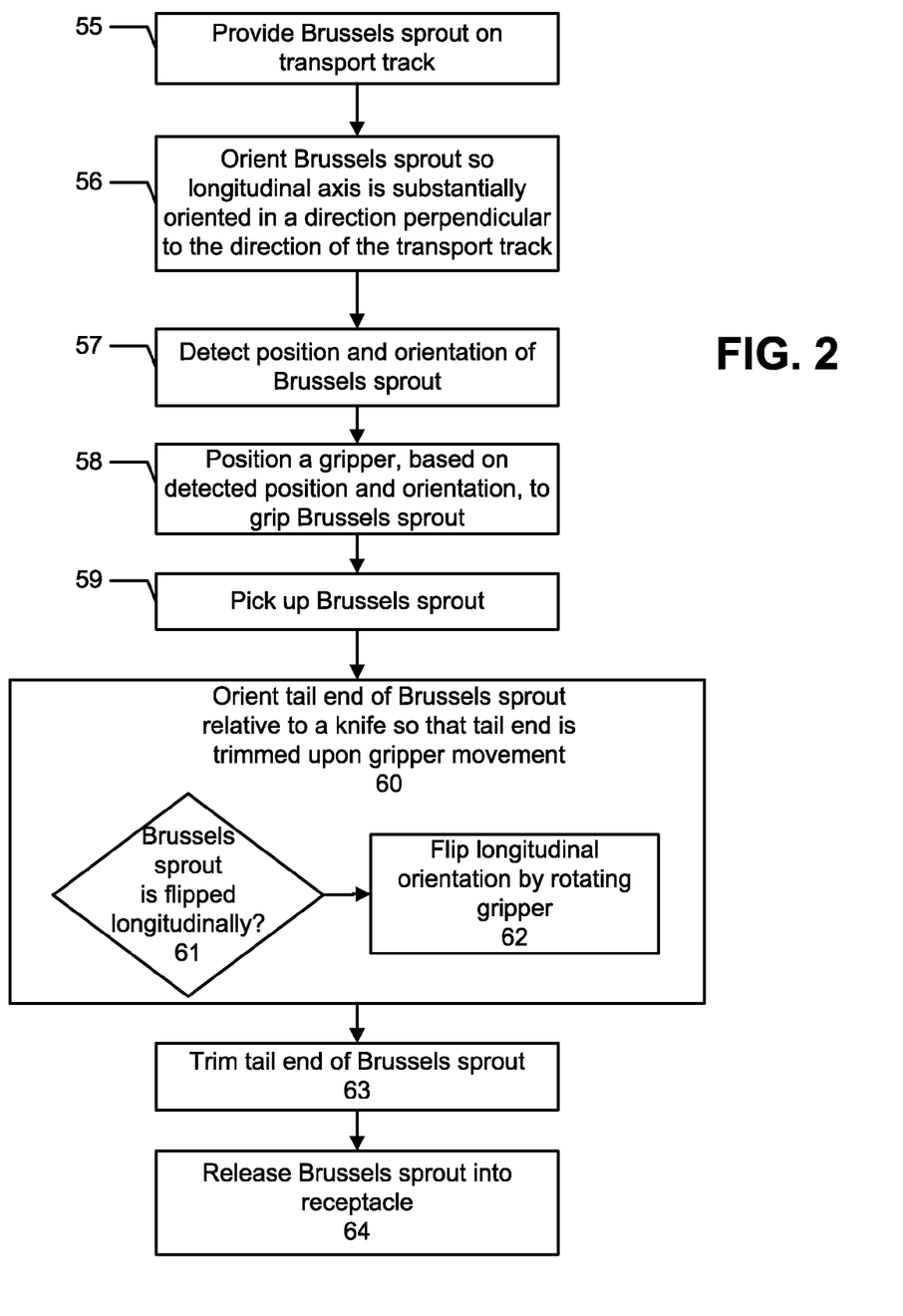
FIG. 2 depicts an example process of trimming a Brussels sprout.

The operation of the device is described with respect to FIG. 2, as follows. At 55, a Brussels sprout is provided on the transport track. At 56, after a Brussels sprout had been transferred to a set of support rollers 13 in the transport track it will be agitated in such a way by the rolling movement of these rollers that it occupies a position in which its longitudinal axis is substantially oriented in a direction perpendicular to the direction of the transport track. There might be a possible deviation of some degrees, but the main direction is like that. At 57, the configuration, position and orientation of the Brussels sprout is detected and at 58, the gripper is positioned in such a way that it will pick up (59) the sprout from its set of support rollers in the optimal way, in which is the gripper is oriented (60) in line with the possible orientation of the Brussels sprout and taking into account its actual shape. The gripper picks up (59) the Brussels sprout and is taking a orientation (60) such that the longitudinal axis of the sprout is perpendicular to the longitudinal direction of the transport track and its lateral position is corrected such that the tail end of the sprout will be trimmed off from the Brussels sprout during the movement along the sliding surfaces. If needed and based upon detection by the detection unit the orientation of the Brussels sprout is reversed over 180° by rotation of the gripper over 180° (61, 62), in order to have the tail end of the Brussels sprout at the side of the cutting blade 20. By positioning and orienting the Brussels sprout in this way by movement of the gripper the tail end can be removed (63) with a very high degree of accuracy, so that the Brussels sprout is almost not damaged. The trimmed Brussels sprout is released (64) into a receptacle.

Figure 3:
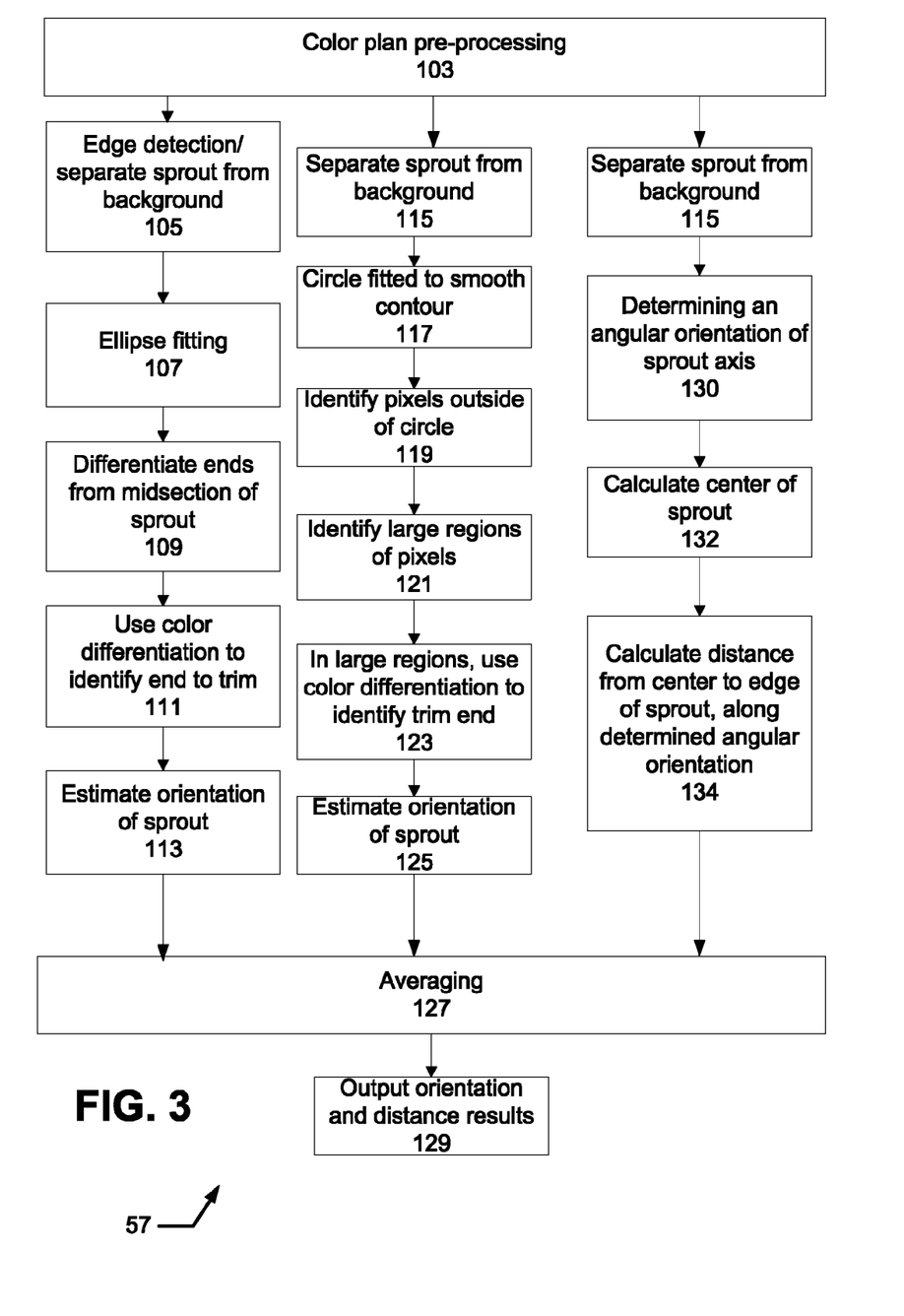
FIG. 3 depicts an example process of estimating a position and orientation of a Brussels sprout using a captured image of the Brussels sprout.

FIG. 3 depicts an example process for detecting position and orientation of Brussels sprouts (57), using an image taken of each Brussels sprout. In an example, each image is taken using a single and contrasting background color, and for example, a black background. The example process comprises a plurality of parallel and different recognition parts, which are used composed into a determined position and orientation. Color pre-processing (103) uses multiple images of sprouts to identify the 2D color plane information, which can be used as input to the following parts of the process In one approach, this process includes edge detection to separate the sprout from background (105) based on the 2D colour plane identified in 103, resulting in an identification of pixels that form a boundary between the sprout and the background. An ellipse is fitted (107) to the detected pixels. A least mean squares fitting algorithm can be used.

Using the ellipse, the ends of the sprout are differentiated (109) from its midsection. For the ends, color differentiation within the sprout is used to identify (111) an end to be trimmed, distinguishing the opposite end. In an example, the trim end contains a higher proportion of white, such that the proportion of white to green is a distinguishing characteristic. An orientation of the sprout is estimated (113).

In FIG. 3, the example process includes a parallel track in which the sprout is separated (115) from background using the 2D colour plane data from 103, and a circle is fitted (117) with a radius that tracks a smooth contour found on the sprout (on the end opposite the trim section). This circle fitting would generally under estimate the extent of the sprout on the side to be trimmed. As such, pixels outside of the circle are identified (119), and regions of such pixels are grouped (121). Among those regions, a color differentiation (123) can be used to identify an end of the sprout to be trimmed (as in 111, described above). From this information, an orientation of the sprout can be estimated (125). Another example approach includes separating (115) the sprout from background, determining (130) an angular orientation of the long center axis of the sprout (rotational axis through ends), calculating (132) a center of the sprout, and calculating (134) a distance from the center to the edge along the determined angular orientation.

The information obtained from each estimation can be averaged or otherwise composited (127) to arrive at a decision concerning the position of the sprout and orientation of the end to be trimmed. These estimations can use different algorithms. This disclosure should not be interpreted to require use of multiple algorithms, and those of ordinary skill would understand that if a single algorithm were found to produce satisfactory results, then a single algorithm can be used. The determined orientation and position can be outputted (129).

Figure 4:
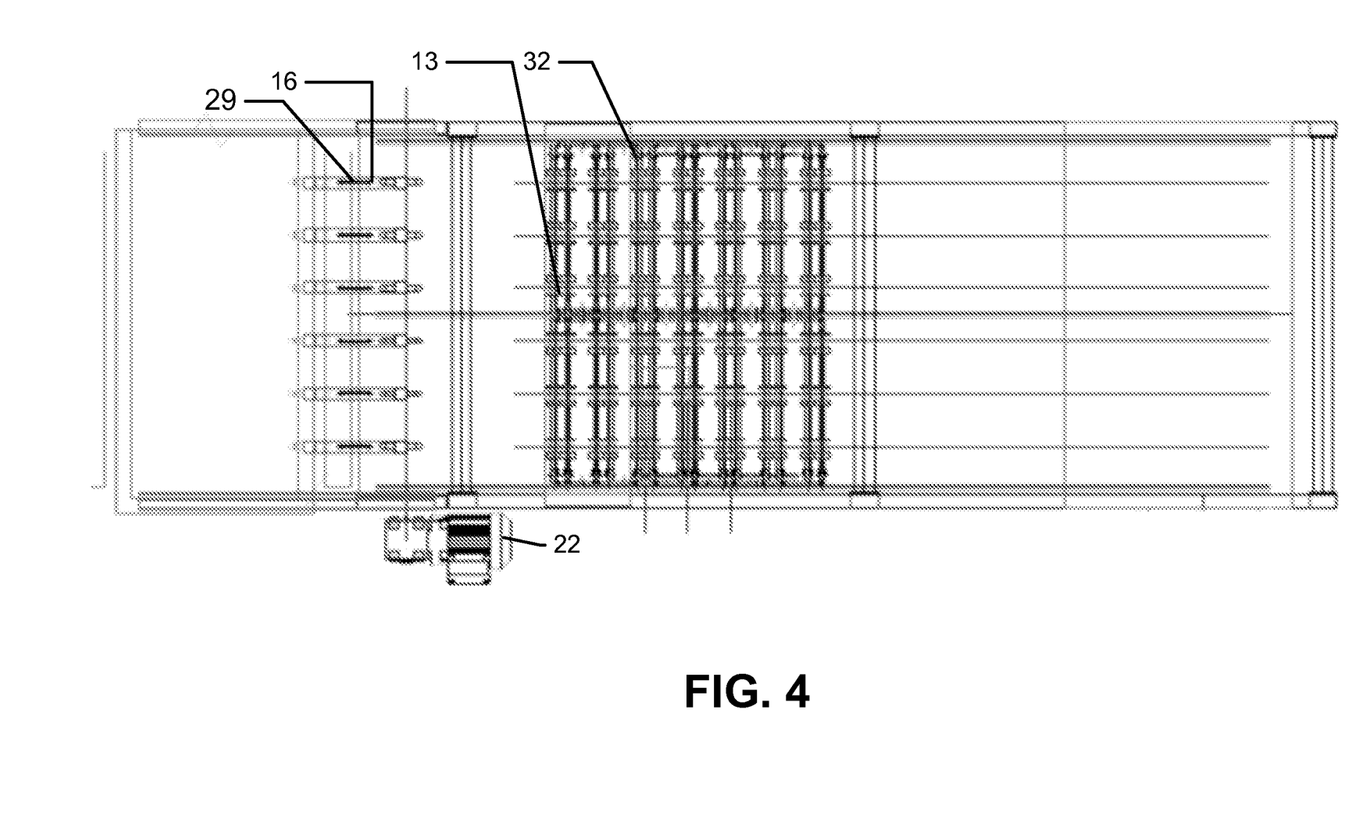
FIG. 4 depicts a top view of an example device that can be used to automatically trim Brussels sprouts.

FIG. 4 depicts a top view of an example device that can automatically trim Brussels sprouts. FIG. 4 depicts some of the elements introduced in FIG. 1. In particular, FIG. 4 depicts grippers 16, and rollers 13. A motor 22 is depicted. In the example of FIG. 4, a set of spinning blades 29 serve to trim the Brussels sprout (while FIG. 1 depicts a set of fixed blades 20). Spinning blades may provide a better cut, reducing damage to the trimmed Brussels sprout. A number of sets of rollers are also depicted, with one set identified as 32.

Figure 5:
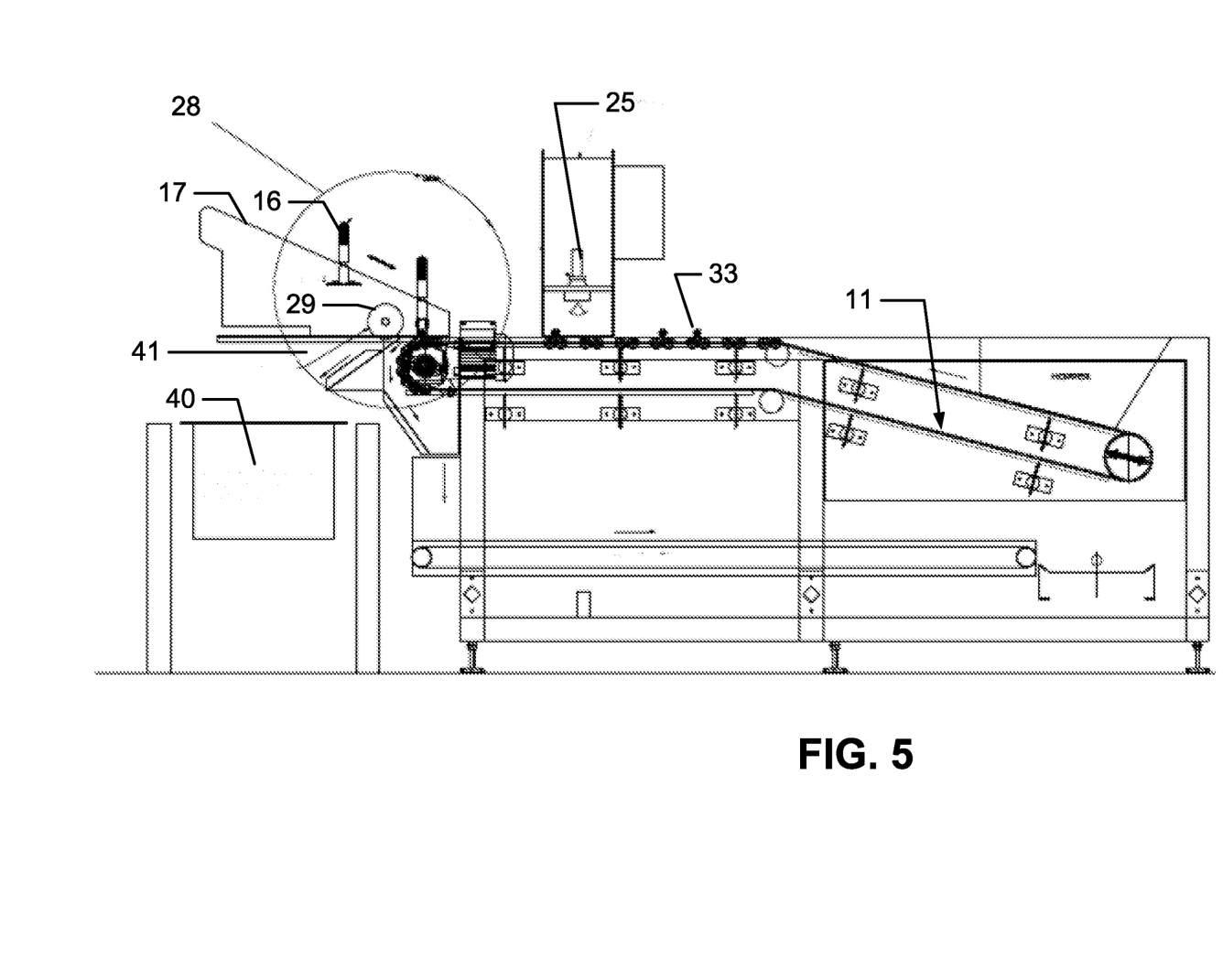
FIG. 5 depicts a side view of the device of FIG. 4.

FIG. 5 depicts a side view of the example device introduced in FIG. 4. FIG. 5 depicts spinner blades 29. FIG. 5 also depicts the grippers 16 in two positions, as they are operable to move on the track 17 apparatus shown in FIG. 1 (which is not shown here in outline, to avoid obstructing grippers 16. A camera 25 is shown relatively disposed to the apparatus portion of FIG. 1, and to the rollers depicted in FIG. 4. The drive chain 11 depicted in FIG. 1 also is identified here. A Brussels sprout 33 is identified, to aid in understanding a path through the machine. A receptacle 40 that collects trimmed sprouts through opening 41 is shown. Such receptacle can be removable and replaced while the machine is in operation.

Figure 6:
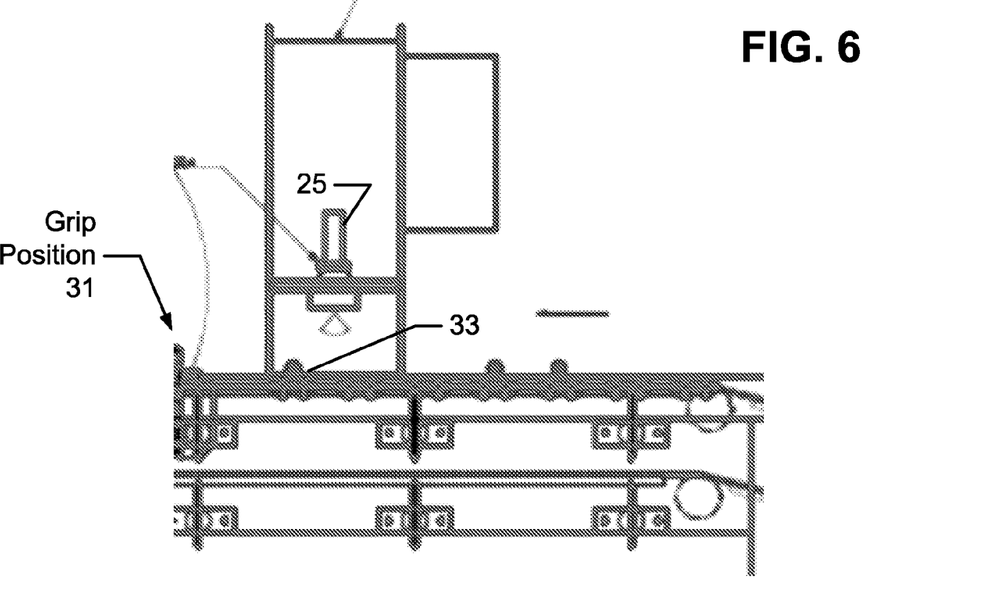
FIG. 6 depicts a larger view of a camera portion of the device of FIG. 4.

FIG. 6 depicts a larger view of the camera 25, and shows sprout 33, moved from a location in FIG. 4. A grip position, at which grippers 16 can grip the sprouts is shown, relative to the side view of the rollers.

Figure 7:
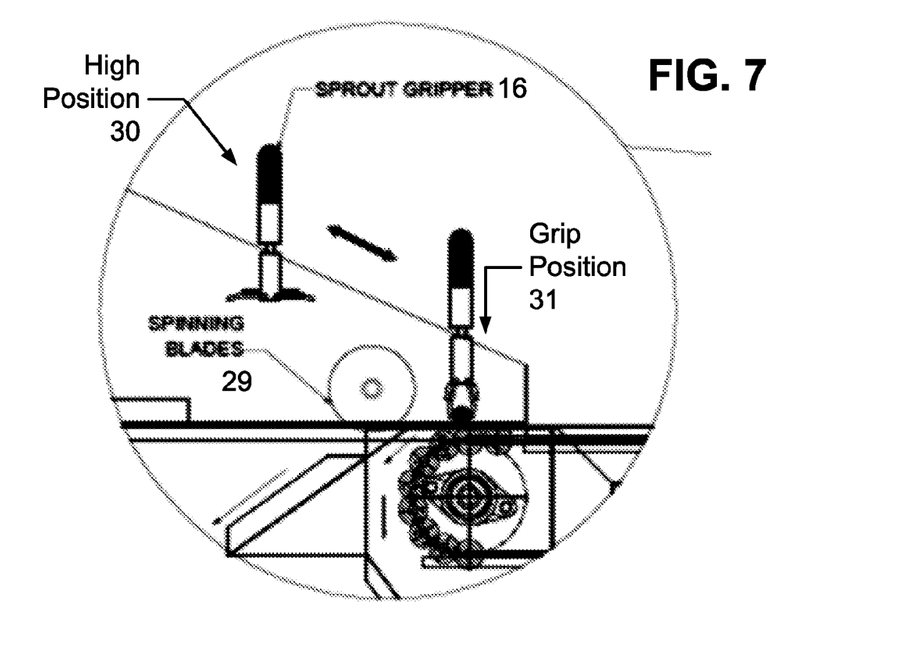
FIG. 7 depicts a larger view of a gripping and trimming portion of the device of FIG. 4 and can also serve as a side view of a device according to the device depicted in FIG. 1.

FIG. 7 shows a detailed view of the area of the device of FIG. 4 proximal grip position 31. Spinner blades 29 are shown, along with gripper 16. A high position 30 is generally identified, and in conjunction with grip position 31 depicts an example movement pattern of grippers 16. Spinning blades 29 are an example of a cutting implement. A variety of other cutting implements can be provided. In one example, a water knife can be provided and disposed so that a cutting stream of water is provided in a location at which gripper 16 can move sprouts to be trimmed across the stream of water, thereby trimming or otherwise cutting the sprout as intended. A cuisinart style blade can be provided, and in such an implementation, gripper 16 would move a tip of the sprout into the blade in a direction traverse to a plane in which the blade spins (as opposed to generally parallel to a plane of spinning blades 29, in the above disclosure). A fixed or moving wire can be used. These all are examples of cutting implements. In some examples, multiple cutting implements can be provided; for example, a tail end can be trimmed by one cutter, and the sprout cut in half by another.

The above disclosures related primarily to an example of trimming a tail end of a Brussels sprout. However, implementations of the disclosure are not limited to trimming a tail end of a Brussels sprout, or to only trimming a tail end of the Brussels sprout. In one example, a Brussels sprout can be cut in half; for example, along a long dimension of the sprout. In the above examples, a Brussels sprout is gripped traverse to the long dimension, so a midline along the long dimension of the sprout is exposed and the sprout does not need to be re-gripped or the sprout re-oriented with respect to gripper 16. Rather, the sprout can simply be repositioned while being held by gripper 16. In one example, gripper 16 can grip a sprout as disclosed above and position the sprout relative to one blade of spinning blades 29 to trim the tail end, as described above. After such tail end trimming operation, the gripper can be controlled to move the sprout, in a relative orientation with respect to one blade of spinning blades 29, to cut the sprout in half. As can be understood from these examples, a variety of trimming operations can be performed using the disclosed gripper 16 by positioning (repositioning) the sprout relative to a blade from blades 29 and moving gripper relative to the blade to complete each of the trimming operations. Where grippers 16 operate to move a sprout along the length by moving generally in one directional motion, grippers 16 can reorient, and reverse motion in order to cut the sprout in half, and then release the sprout, for example.

Grippers 16 are programmatically controlled, and thus trimming operations can be selected and sequenced as required. For example, one batch of sprouts may be both trimmed and cut in half, while another batch may be trimmed only, and a further batch only cut in half. Cutting in half and trimming the tail end are examples of trimming operations that can be performed according to the disclosure. Grippers used in implementations can have different capabilities, such as movement speed, accuracy, and degrees of freedom. Other components of the overall system can be selected or adjusted in view of a type of gripper to be used, and vice versa. These considerations are within the scope of decisions to be made by those of ordinary skill, in view of these disclosures.

In the above disclosure, it was described that gripper 16 does not need to release a sprout between the example cutting operations of trimming and cutting in half. However, this is not to the exclusion of releasing and regripping the sprout, if desired.

Figure 8A:
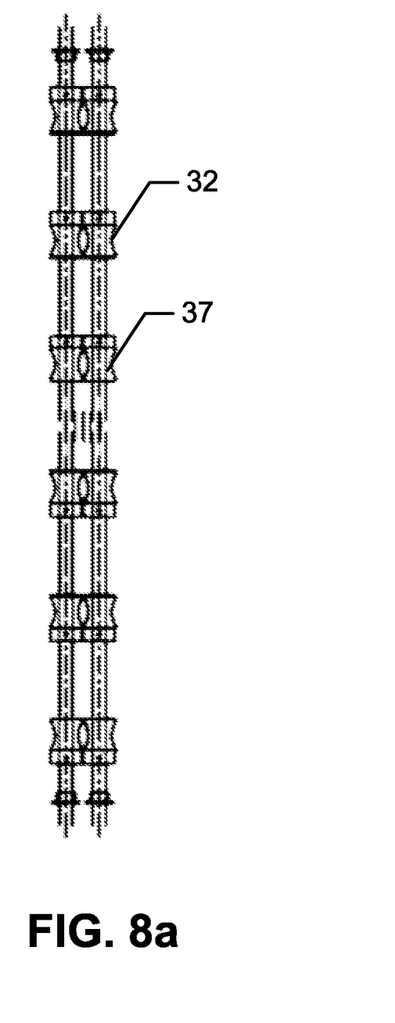
FIGS. 8a and 8b depict examples of rollers that can be used in the device of FIG. 4.
Figure 8B:
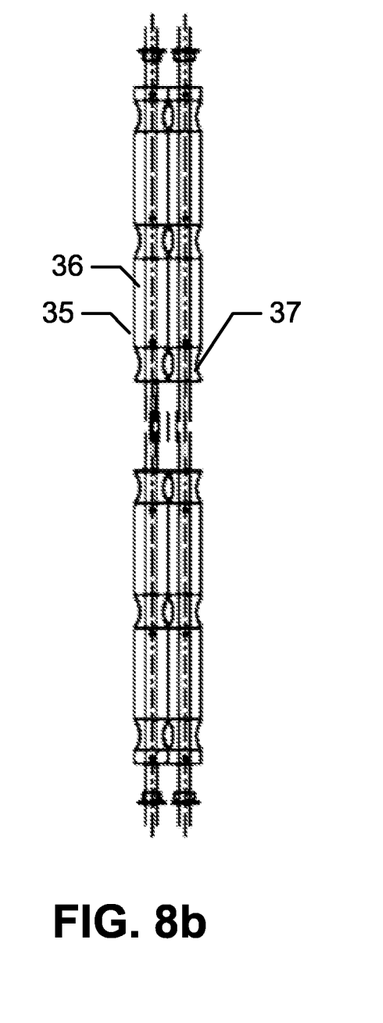

FIG. 8*a* depicts a magnified view of rollers 32 depicted in the top view of FIG. 4. FIG. 8*b* depicts a top view of another embodiment of such rollers, identified as rollers 35. Rollers 35 have a solid portion 36 in locations where rollers 32 have gaps. Rollers 32 and 35 each have a narrow waist providing diabolo-shaped portions 37.

The above disclosure provided examples where rollers 32 pre-orient sprouts so that they are in a relatively similar position at a point when they are imaged and gripped by grippers 16. It is expected that this approach may aid in efficiency. However, other examples include situations where a gripper can grip a sprout that may be in an arbitrary orientation. So, rollers 32 may be excluded or may be substituted by another delivery mechanism that does not tend to orient sprouts into a generally common orientation. Whether or not to use rollers 32 may be determined according to an amount of (extra) time, if any, required to determine an orientation of a sprout to be gripped, as well as degrees of freedom or movement provided by a gripper to be used. Also, throughput considerations relating to how quickly an arbitrary orientation can be gripped or the amount of slippage may be other considerations that would occur to those of ordinary skill in view of the disclosure.

It also should be apparent from the above disclosures that implementations of the examples are scalable, in that more instances of rollers, cameras, grippers and cutters can be provided in a parallel format to increase throughput. These examples included examples where there was a 1:1 correspondence between rollers, cameras and grippers. However, some implementations may provide that one set of rollers feeds multiple camera and gripper paths, or that multiple sets of rollers feed one camera and gripper path, for example.

The invention is not restricted to the described embodiments as shown in the annexed drawings, but that within the scope of the claims modifications, can be applied without departing from the inventive concept.

The invention claimed is:

1. A process for removing tail ends of Brussels sprouts from a stack of Brussels sprouts, comprising:
   separating a Brussels sprout from the stack of Brussels sprouts;
   transferring the separated Brussels sprout to a transport track;
   manipulating the Brussels sprout on the transport track to orient the Brussels sprout;
   defining a position and an orientation of each Brussels sprout on the transport track using an optical detector, the optical detector producing an output indicative of the defined position and orientation of each Brussels sprout;
   individually removing each Brussels sprout from the transport track via a gripper, the gripper including two gripping arms mutually coupled for articulation, each gripping arm being in contact with the Brussels sprout when the Brussels sprout is being removed from the transport track by the gripper; and
   removing the tail end of the Brussels sprout while the Brussels sprout is secured via the two gripping arms of the gripper.

2. The process according to claim 1, wherein the orienting of the Brussels sprout comprises calculating a location of a cut to remove the tail end based on a distance to a point on the sprout.

3. The process according to claim 1, wherein the removing the tail end of the Brussels sprout includes a cutting tool and an accuracy of relative positioning of the Brussels sprout and the cutting tool for the removing is within 1 mm deviation.

4. The process according to claim 1, wherein the defining occurs before each Brussels sprout reaches a termination of the transport track.

5. The process according to claim 1, wherein the removing the tail end of the Brussels sprout includes a cutting tool that comprises at least one blade.

6. The process according to claim 1, wherein the removing the tail end of the Brussels sprout includes a water knife.

7. The process according to claim 1, further comprising:
   after the individually removing each Brussels sprout from the transport track, releasing the Brussels sprout into a receptacle.

8. An apparatus for processing Brussels sprouts, comprising:
   a mechanism that separates a Brussels sprout from a stack of Brussels sprouts;
   a transport track for receiving a Brussels sprout separated from a stack of Brussels sprouts, the transport track operable to manipulate or otherwise cause the Brussels sprout to be oriented and held in place;
   an optical position and orientation detector located relative to a termination of the transport track, the detector operable to produce an output indicative of the position and orientation of each Brussels sprout on the transport track; and a gripper operable to individually remove each Brussels sprout from the transport track while secured by the gripper, the gripper including two gripping arms mutually coupled for articulation, each gripping arm being in contact with the Brussels sprout when the Brussels sprout is being removed from the transport track by the gripper; and a cutting device to remove a tail end of the Brussels sprout while the Brussels sprout is secured via the two gripping arms of the gripper.

9. The apparatus of claim 8, wherein the detector comprises a camera positioned relative to the transport track for capturing a picture of the Brussels sprout.

10. The apparatus of claim 8, wherein the detector is configured to capture an image of the Brussels sprout, over a contrasting background, the image comprising pixels of the Brussels sprout and background pixels, to fit an ellipse to the Brussels sprout, and distinguish the tail end to be removed from an opposite end of the Brussels sprout based on a characteristic distinguishing the tail end from the opposite end.

11. The apparatus of claim 10, wherein the detector is operable to identify candidate ends for the tail end and the opposite end by color or shape characteristics of each of the candidate ends.

12. The apparatus of claim 8, wherein the cutting device comprises at least one spinning blade.

13. The apparatus of claim 8, further comprising a receptacle positioned to receive the Brussels sprout released from the gripper.

14. The apparatus of claim 8, wherein the transport track comprises:
at least two rollers, each roller having truncated cone surfaces so as to be diabolo-shaped, and
each of the rollers being rotatable about a similar axis of rotation, and so that the roller pairs are positioned side by side with their rotation axes perpendicular to a longitudinal direction of the transport track.

15. The apparatus of claim 8, wherein the transport track comprises:
at least two pairs of rollers, each roller shaped as a truncated cone,
each pair of the rollers being rotatable about a similar axis of rotation, and relatively disposed so that truncated cone surfaces of the rollers of that pair of rollers face each other, and so that the roller pairs are positioned side by side with their rotation axes perpendicular to a longitudinal direction of the transport track.

16. The apparatus of claim 15, wherein the optical position and orientation detector is configured to take a photograph of the Brussels sprout, and during a period of time in which the photograph is taken, the roller pairs on which the Brussels sprout is positioned are not rotating.

17. The apparatus of claim 15, wherein the transport track, the optical position and orientation detector, the gripper, and the cutting device comprise one parallel processing line of a plurality of parallel processing lines, each capable of processing one of the Brussels sprouts.

18. The apparatus of claim 17, wherein the gripper of the plurality of parallel processing lines are all mounted on a frame, operable to move the grippers from near the transport track to a position up and away, and wherein that movements causes each of the grippers to pass near a respective cutting device for that processing line.

19. The apparatus of claim 8, wherein the gripper arms are mounted on a frame.

20. The apparatus of claim 19, wherein the frame is operable to change a position of the gripper arms.

21. The apparatus of claim 19, wherein the frame is operable to move along slider elements positioned at opposite ends of the frame.

22. The apparatus of claim 8, wherein the gripper is operable to reverse an orientation of the Brussels sprout in order to position the tail end of the Brussels sprout relative to the cutting device.

23. The apparatus of claim 8, wherein the cutting device is a water knife.

24. The apparatus of claim 8, wherein the gripper is operable to orient the Brussels sprout in order to position the tail end of the Brussels sprout relative to the cutting tool.

25. An apparatus for processing Brussels sprouts, comprising:
a mechanism that separates a Brussels sprout from a stack of Brussels sprouts;
a transport track for receiving a Brussels sprout separated from a stack of Brussels sprouts, the transport track operable to manipulate or otherwise cause the Brussels sprout to be oriented and held in place;
an optical position and orientation detector located relative to a termination of the transport track, the detector operable to produce an output indicative of the position and orientation of each Brussels sprout on the transport track; and
a gripper operable to individually remove each Brussels sprout from the transport track, the gripper including two gripping arms mutually coupled for articulation, each gripping arm being in contact with the Brussels sprout when the Brussels sprout is being removed from the transport track by the gripper; and
means for removing a tail end of the Brussels sprout while the Brussels sprout is secured via the two gripping arms of the gripper.

26. An apparatus for processing Brussels sprouts, comprising:
a mechanism that separates a Brussels sprout from a stack of Brussels sprouts;
a transport track for receiving a Brussels sprout separated from a stack of Brussels sprouts, the transport track operable to manipulate or otherwise cause the Brussels sprout to be oriented and held in place;
an optical position and orientation detector located relative to a termination of the transport track, the detector operable to produce an output indicative of the position and orientation of each Brussels sprout on the transport track; and
a removal device for removing each Brussels sprout from the transport track by individually gripping each Brussels sprout from the transport track in order to orient the Brussel sprout according to the output produced by the optical detector, wherein the removal device is a gripper comprising two gripping arms mutually coupled for articulation, and the gripper arms are mounted on a frame; and
a cutting device to remove a tail end of the Brussels sprout in accordance with the orientation of the Brussel sprout after the Brussels sprout is removed from the transport track.

* * * * *